March 5, 1929.  M. HAZEN  1,704,321
MACHINE FOR FORMING METAL STRIPS AND METHOD
OF MAKING SECTIONS FOR RADIATOR CORES
Filed July 16, 1926  7 Sheets-Sheet 1

INVENTOR.
MORRIS HAZEN
BY
ATTORNEY.

March 5, 1929.                    M. HAZEN                    1,704,321
MACHINE FOR FORMING METAL STRIPS AND METHOD
OF MAKING SECTIONS FOR RADIATOR CORES
Filed July 16, 1926          7 Sheets-Sheet 4

INVENTOR.
MORRIS HAZEN
BY
ATTORNEY.

March 5, 1929. M. HAZEN 1,704,321
MACHINE FOR FORMING METAL STRIPS AND METHOD
OF MAKING SECTIONS FOR RADIATOR CORES
Filed July 16, 1926 7 Sheets-Sheet 6

March 5, 1929.   M. HAZEN   1,704,321
MACHINE FOR FORMING METAL STRIPS AND METHOD
OF MAKING SECTIONS FOR RADIATOR CORES
Filed July 16, 1926   7 Sheets-Sheet 7

INVENTOR.
Morris Hazen
BY James N. Ramsey
ATTORNEY.

Patented Mar. 5, 1929.

1,704,321

UNITED STATES PATENT OFFICE.

MORRIS HAZEN, OF CINCINNATI, OHIO.

MACHINE FOR FORMING METAL STRIPS AND METHOD OF MAKING SECTIONS FOR RADIATOR CORES.

Application filed July 16, 1926. Serial No. 122,829.

The invention relates to a machine for forming metal strips for constructing an internal combustion engine radiator core, each section being constructed from a continuous metal strip by bending the material upon itself.

A similar metal strip, and method or process of constructing an internal combustion engine radiator core is described and claimed in my co-pending application Serial No. 709,429, filed April the 28th, 1924.

The object of the invention is to provide a machine for forming strips from which to construct a simple, efficient, economical and desirable section of an internal combustion engine radiator core.

Other objects will be apparent as the description proceeds.

The invention consists in the combination of the elements, the arrangement of the parts, and in the details of the construction, as hereinafter specified and claimed.

In the drawings:

Fig. 1 is a plan view of the invention.

Fig. 2 is a plan view of the cutting and forming die clutch mechanism with parts broken away;

Fig. 2ª is a section of the main driving shaft mechanism with parts broken away;

Fig. 9 is a transverse vertical section of the forming rollers, with parts broken away, and showing a metal strip being formed;

In the preferred construction of the invention I provide radiator strip forming machine 1 having bed 2 supported by supports 3. Extending transversely of bed 2 is main driving shaft 4 mounted in adjustable journals 5 and 6, respectively, fixed to sides 7 and 8 of the bed. Rotatably mounted on outer end 9 of shaft 4 is tube 10 having wheels or pulleys 11 and 12, and gear 13 fixed thereto. Formed in end 14 of tube 10 are clutch teeth 15 adapted to mesh with clutch teeth 16 formed in end 17 of tube 18, (mounted on shaft 4), whereby main driving shaft clutch 15' is comprised. The tube 18 is maintained against rotary movement on the shaft, but permitted to slide longitudinally, as by pin 19 being fixed to the shaft and protruding through slot 20 which extends longitudinally in tube 18.

Meshing with gear 13 is auxiliary gear 21 fixed to protruding end 22 of shaft 23 rotatably mounted in bearings 24 and 25, respectively, fixed to sides 7 and 8 of bed 2.

Extending transversely of and above bed 2 is cutting and forming die shaft 26 rotatably mounted in bearings 27 and 28, respectively, secured to sides 7' and 8' of support 26' suitably secured to bed 2.

Rotatably mounted on end 29 of shaft 26 is tube 30 having pulley 31 integral therewith. The belt 32 operatively connects pulley 31 with pulley 12, whereby rotary movement is imparted to shaft 26.

Formed in end 33 of tube 30 are clutch teeth 34 adapted to mesh with clutch teeth 35 formed in end 36 of tube 37 whereby cutting die clutch 34' is comprised. The tube 37 is slidably mounted on shaft 26 and maintained against rotary movement on shaft 26, as by pin 38 fixed to the shaft and protruding through slot 39 which extends longitudinally in tube 37, whereby the tube is adapted to be slid longitudinally of the shaft.

Meshing with gears 40 on shaft 4, are gears 41 fixed to shaft 41' rotatably mounted in bearings 42 and 43, respectively, fixed to sides 7 and 8 of bed 2. Keyed to shafts 4 and 41', respectively, are strip forming rollers 44 and 45 respectively, having outer cooperating die faces 46 and 47 adapted to mesh for the purpose of forming strip 48', as hereinafter fully explained, and shown in Figs. 17, 18, 19, 20, and 21.

The pulley 11 is connected by means of a usual belt (not shown) to a suitable outside source of supply, whereby when clutch teeth 15 and 16, respectively, of tubes 10 and 18, are in mesh, rotary movement is imparted to shaft 4, which rotates gears 40 thereby, through gears 41, imparting rotary movement to rollers 44 and 45.

The strip 48 is fed between rollers 44 and 45 as by being mounted on drum 49 which is mounted on shaft 50 having its ends 51 and 52, respectively, mounted in bearings at 53 and 54, respectively, in sides 7 and 8 of bed 2. To facilitate in maintaining strip 48 in proper position to be received between the rollers, the upper and lower guide rods 55 and 56, having ends 57 and 58, respectively fixed in sides 7 and 8 of bed 2, extend in staggered relation transversely of the bed, whereby the strip is adapted to pass successively between the rods, as clearly shown in Fig. 10, after which it passes between rollers 55' and 56' rotatably mounted in the sides of the bed. Suitably fixed to the guide rods are guide plates 59 and 60, arranged in spaced apart relation, to maintain strip 48 against lateral movement, and in proper alinement with rollers 44 and 45, whereby the strip is adapted to be automatically fed in proper relation between the rollers.

The formed portion 48' of strip 48, after passing between the rollers, is adapted to be pushed in groove 61, in upper side 62 of the bed, toward end 63 of the bed and between male and female members 64 and 65 of cutting die 66.

To provide efficient means whereby strip 48' will be automatically severed and its end 67 bent after each complete revolution of rollers 44 and 45, I provide intermittent stop mechanism to permit rollers 44 and 45 to remain stationary for a short period after each complete revolution, and to simultaneously operatively connect cutting die 66 with the source of power, whereby the strip 48 is adapted to be automatically formed, severed into the required lengths and have its end 67 bent to form strip 48', hereinafter fully explained.

Mounted on side 8' (of support 26') and side 8 (of bed 2) are rocker arms 68 and 69, respectively, having ends 70 and 71, respectively, adapted to be engaged by curved projections 72 and 73, respectively, integrally formed with outer and inner sides 74 and 75 of gear 21.

Secured to ends 76 and 77, respectively, of arms 68 and 69 are ends 78 and 79, respectively, of coil springs 80 and 81, respectively, having ends 82 and 83 secured to the narrow and wide sides 84 and 85, respectively, of clutch operating tubes 86 and 87, respectively, rotatably mounted on shafts 26 and 4 and adjacent tubes 37 and 18, respectively, whereby a part of a full rotation of either the tubes 86 and 87 is adapted to effect meshing or unmeshing of the clutches 15' and 34', as by tapered ends 88 and 89, of the tubes, respectively engaging end 90 of tube 9' (stationarily positioned on shaft 26) and support 92 fixed to side 8 of bed 2, by bolts 93.

Figure 7:
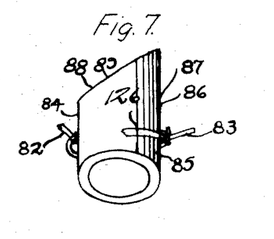
Fig. 7 is a perspective view of a clutch operating tube.

In Fig. 7 is a perspective view of the tube which is shown to represent either tube 86 or 87.

Figures 1, 2, 2A, 3:
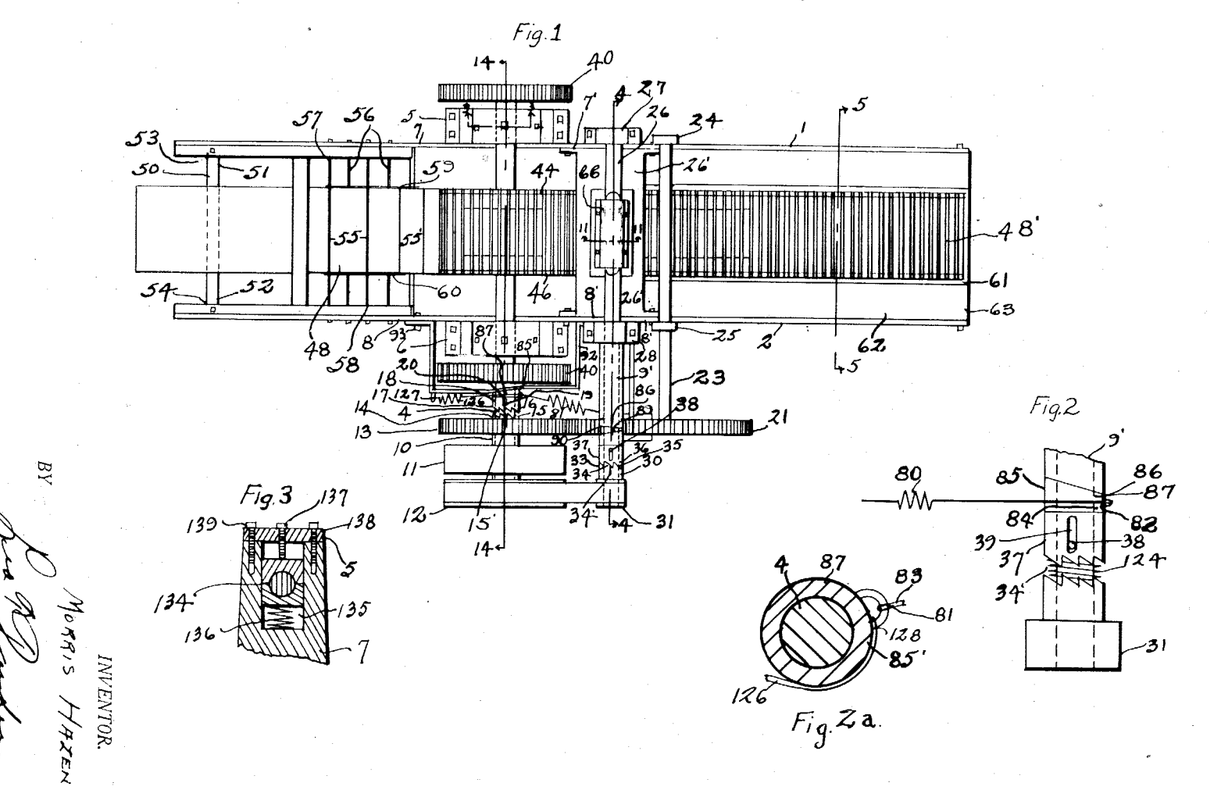
Figure 3:
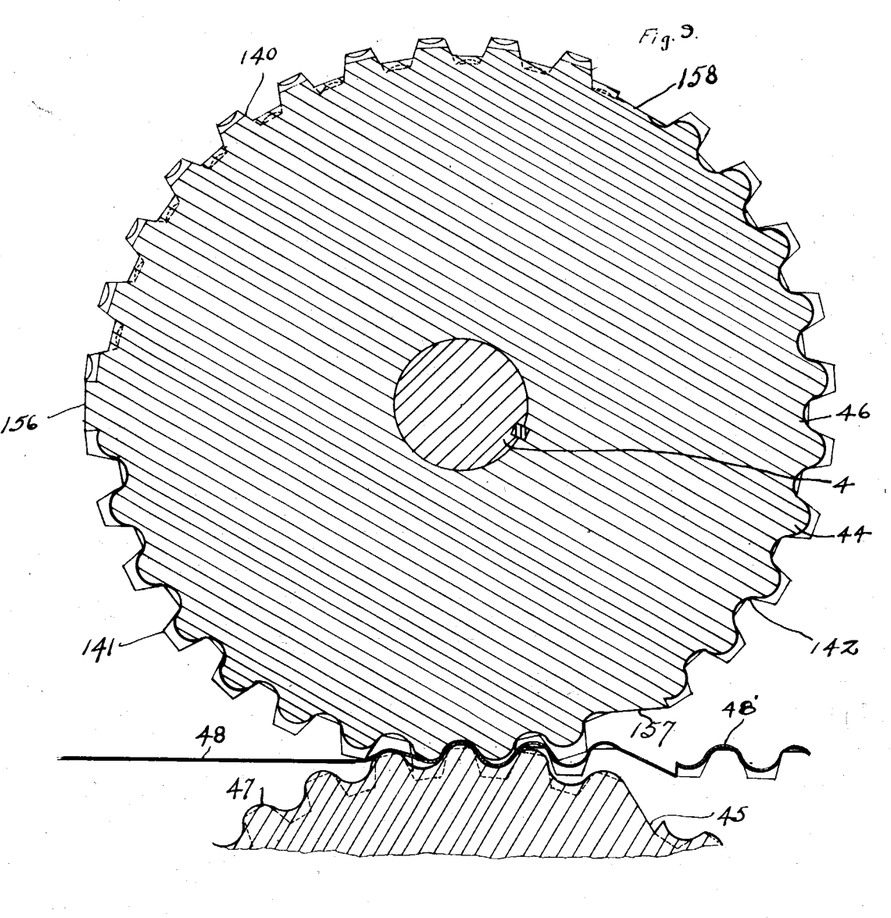
Fig. 3 is a section of the main driving shaft bearing, with parts broken away, taken on line 3—3 in Fig. 1.
Figures 4, 5, 6, 8:
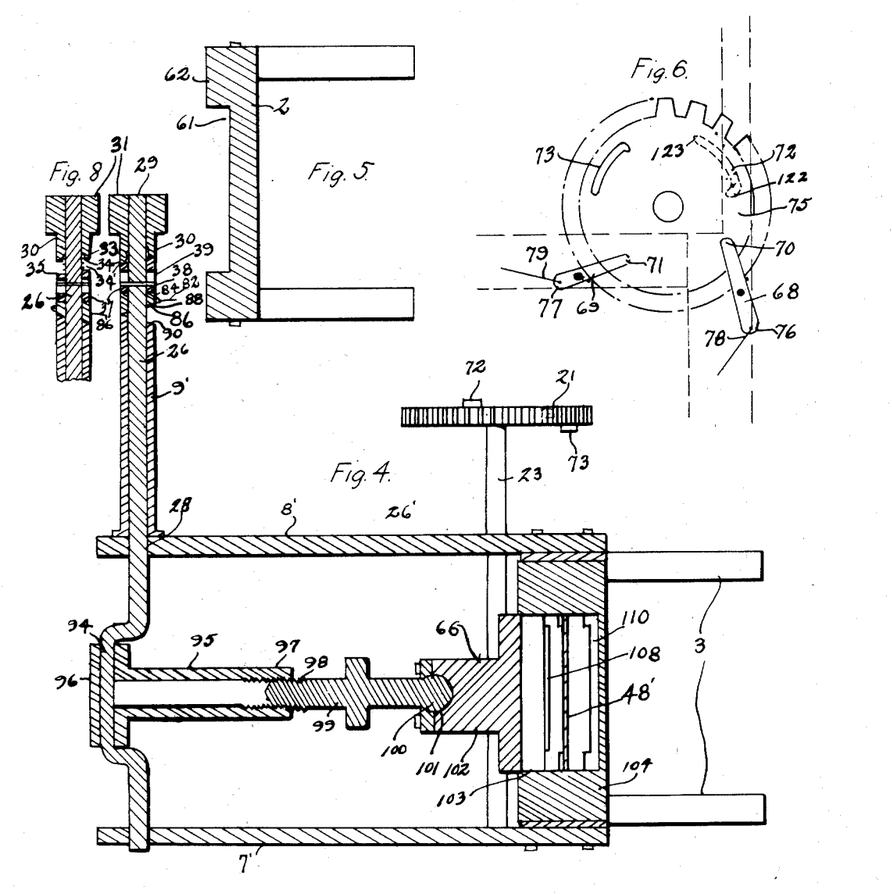
Fig. 4 is a section taken on a line corresponding to 4—4 in Fig. 1.
Fig. 5 is a section taken on a line corresponding to 5—5 in Fig. 1.
Fig. 6 is an inside elevational view of the auxiliary gear.
Fig. 8 is a section, with parts broken away, showing the cutting and forming clutch mechanism in unmeshed position.
Figure 10:
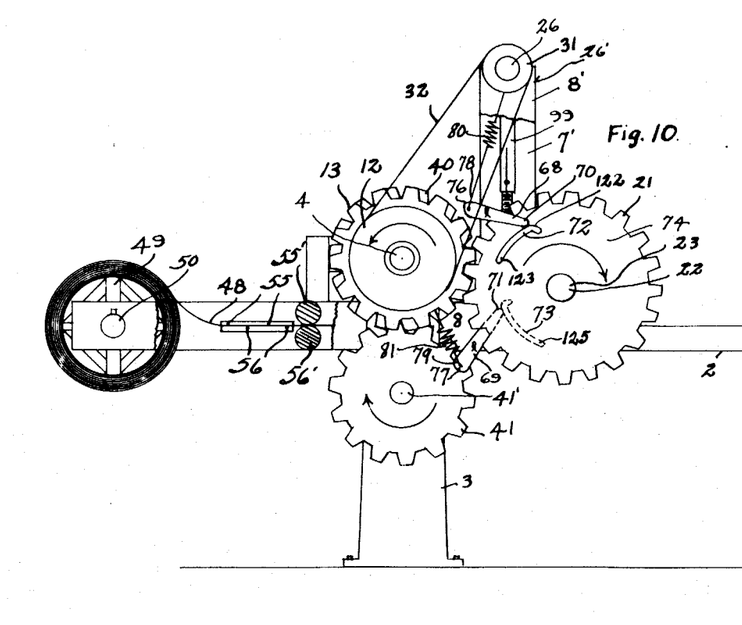
Fig. 10 is a side elevational view of the invention with parts in section and parts broken.

Assume the mechanism is positioned, as shown in Figs. 1 and 10, with arms 68 and 69 engaged with projections 72 and 73, in which position end 76 of arm 68 is forced downwardly causing coil spring 80 to rotate narrow side 84 of tube 86 from the position shown in Figs. 2 and 8 to the position shown in Figs. 1 and 4, whereby tube 37 is forced toward tube 30 thereby engaging clutch 34′ whereby rotary movement is imparted to shaft 26 through pulley 12, belt 32, pulley 31 and tube 30, clutch 34′, tube 37 and pin 38.

Formed in shaft 26 is crank 94 adapted to impart reciprocating movement to connecting rod 95 having its ends 96 and 97, respectively, rotatably mounted on crank 94 and threaded to end 98 of staff 99 having ball 100 fitted into socket 101 of plunger 102 slidably fitted into recess 103 in block 104 mounted on bed 2. The ball 100 is maintained in socket 101 by plate secured in position by bolts.

Suitably secured to the bottom of the plunger are coil springs 105 and 106 having their lower ends connected with forms 107 and 108 having their lower sides formed to co-operate with the form of strip 48′ and the upper side of forms 109 and 110 resting on coil springs 111 and 112 in the bottom of recess 103.

Extending through block 104 is slot 113 adapted to receive strip 48′. Through the mechanism previously described, the plunger 102 is adapted to be forced downwardly from the open position shown in Fig. 11 to the position shown in Fig. 12 and then to the position shown in Fig. 13 for permitting the strip to be severed, as by cutting edges 114 and 115 of upwardly extending stud 114; integral with block 104, being engaged by edges 116 and 117, respectively, of downwardly extending lugs 118 and 119, integral with plunger 102, after which further downward movement of the plunger will bend end 67 of the strip, as by edge 120 of lug 118 forcing the end of the strip in contact with side 121 of form 109. Further movement of crank 94 removes plunger 102 from the position shown in Fig. 13 to the position shown in Fig. 11, whereby springs 105, 106, 111 and 112 expand and the severed strip 48′ is permitted to be removed from cutting die 66.

Figure 11:
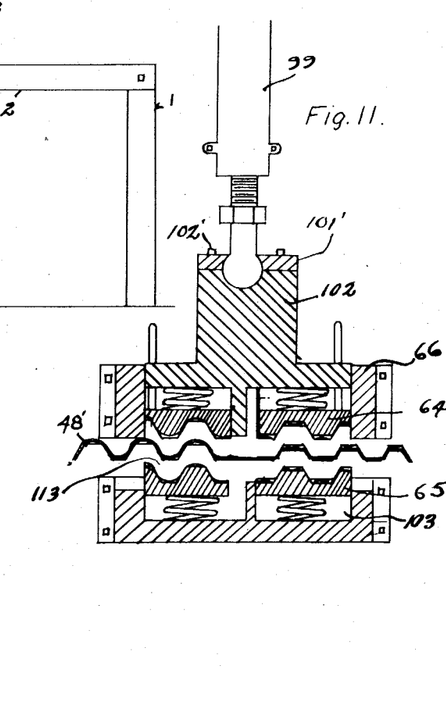
Fig. 11 is a section taken on a line corresponding to 11—11 in Fig. 1, with parts removed and parts broken away, and showing the cutting and forming die in open position.
Figure 12:
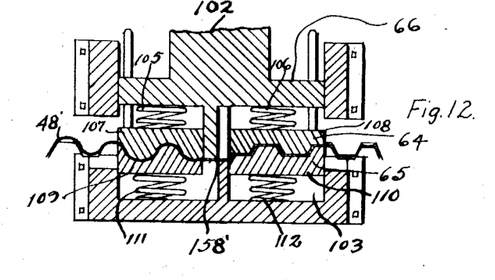
Fig. 12 is the same view showing the mechanism in partly closed position.
Figures 13, 16:
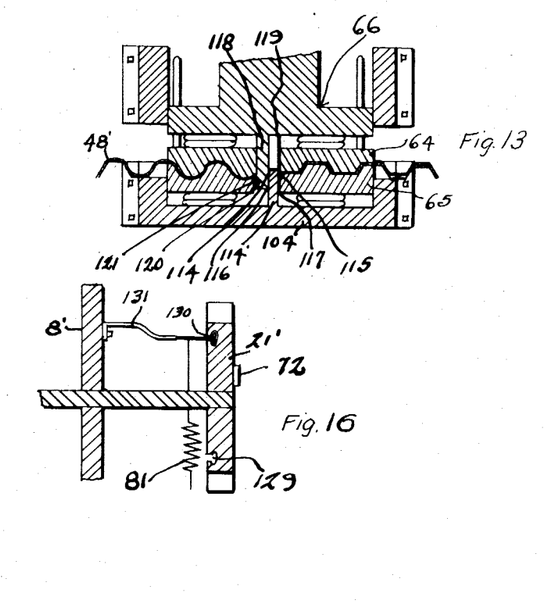
Fig. 13 is the same view showing the mechanism in closed position after the strip is severed and its end is bent.
Fig. 16 is a longitudinal section, with parts broken away, showing a modified form of the stop mechanism.

The mechanism is arranged so that previous to the end 70 of arm 68 engaging end 122 of projection 72, the cutting and forming mechanism 66 is in the position shown in Fig. 11 and during the traverse of arm 68 from end 122 to end 123 of projection 72 the described positions of the cutting and forming die, shown in Figs. 12 and 13, are effected. When end 70 of arm 68 disengages end 123 of projection 72 the coil spring 80 forces end 76 of the arm upward and coil spring 124, shown in Fig. 2, around shaft 26, communicates sufficient force through tube 37 to cause tube 86 to assume the position shown in Fig. 2, whereby the clutch 34′ is disengaged and rotary movement is not imparted to shaft 26 by pulley 31.

Simultaneous with engagement of end 70 of arm 68 with projection 72, the end 71 of arm 69 engages projection 73 and thereby, through spring 81, forces the tube 87 in the position shown in Fig. 1, whereby the clutch 15′ is disengaged, thereby disconnecting the power from rollers 44 and 45 and permitting them to remain stationary while the cutting and forming mechanism 66 is in operation.

When end 71 of arm 69 is disengaged from end 125 of projection 73 (simultaneously with the disengagement of arm 68 with projection 72) the tension in spring 81 is relieved and spring 126, having its ends 127 and 128, respectively, fixed to support 92 and wide side 85′ of tube 87, forces the clutch 15′ into engagement, whereby through tube 10, clutch 15′, tube 18 and pin 19 rotary movement is imparted to shaft 4, thereby, through gears 40 and 41, rotary movement is imparted to rollers 44 and 45 to form strip 48.

The mechanism is arranged and the gear ratio is figured so that clutch 15′ is disengaged and the clutch 34′ is engaged at the end of each complete revolution of the rollers, whereby the length of formed strip 48′ is equal to the circumference of a roller.

Figure 15:
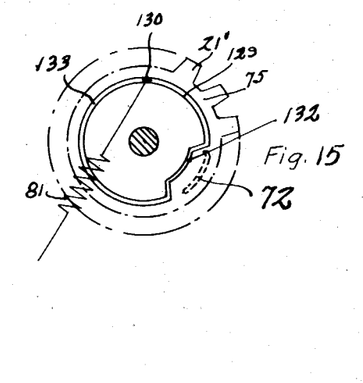
Fig. 15 is an inside elevational view showing a modified form of the auxiliary gear.

In Figs. 15 and 16 I show a modification of the mechanism for disconnecting and connecting power with rollers 44 and 45, and cutting and forming mechanism 66.

The inner face 75 of gear 21′ is provided with curved groove 129 into which fits flexible end 130 of arm 131 fixed to side 8′ of support 26′. Secured to arm 131 is the coil spring 81, also, secured to wide side 85′ of tube 87, whereby when end 130 of arm 131 travels in the inwardly receding portion 132, of the groove, the tension in spring 81 is relieved thereby permitting the tension in the spring 126 to rotate tube 87 to the position shown in Fig. 1 whereby the clutch 15′ is disengaged. Simultaneously with the entrance of end 130 of arm 131 in portion 132 of groove 129, the end 70 of arm 68 engages projection 72, thereby disconnecting power from shaft 26. When end 130 of the arm enters the circular portion 133 of the groove, the spring 81 rotates tube 87 thereby engaging clutch 15′.

Figure 14:
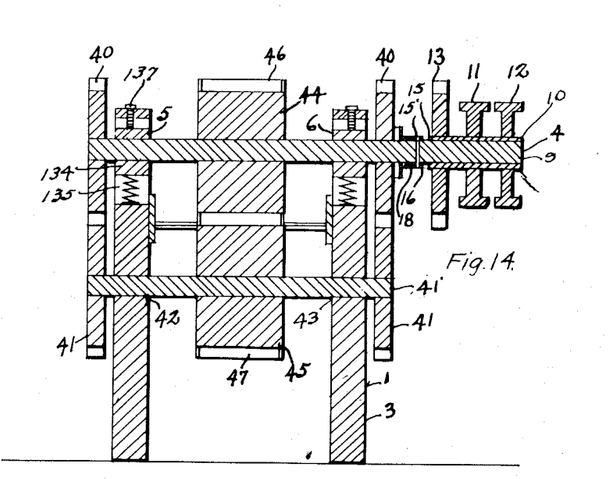
Fig. 14 is a section taken on a line corresponding to 14—14 in Fig. 1, with parts removed.

In Figs. 3 and 14 is shown means for adjusting roller 44. Bearings 5 and 6 each comprise bushing 134 received in recess 135 of support 3. The bushing rests on coil spring 136, whereby screwing and unscrewing bolts 137 threaded in plate 138, raises and lowers shaft 4. The plate 138 is secured in position by bolts 139.

Figures 17, 18, 19, 20, 21, 22, 23, 24:
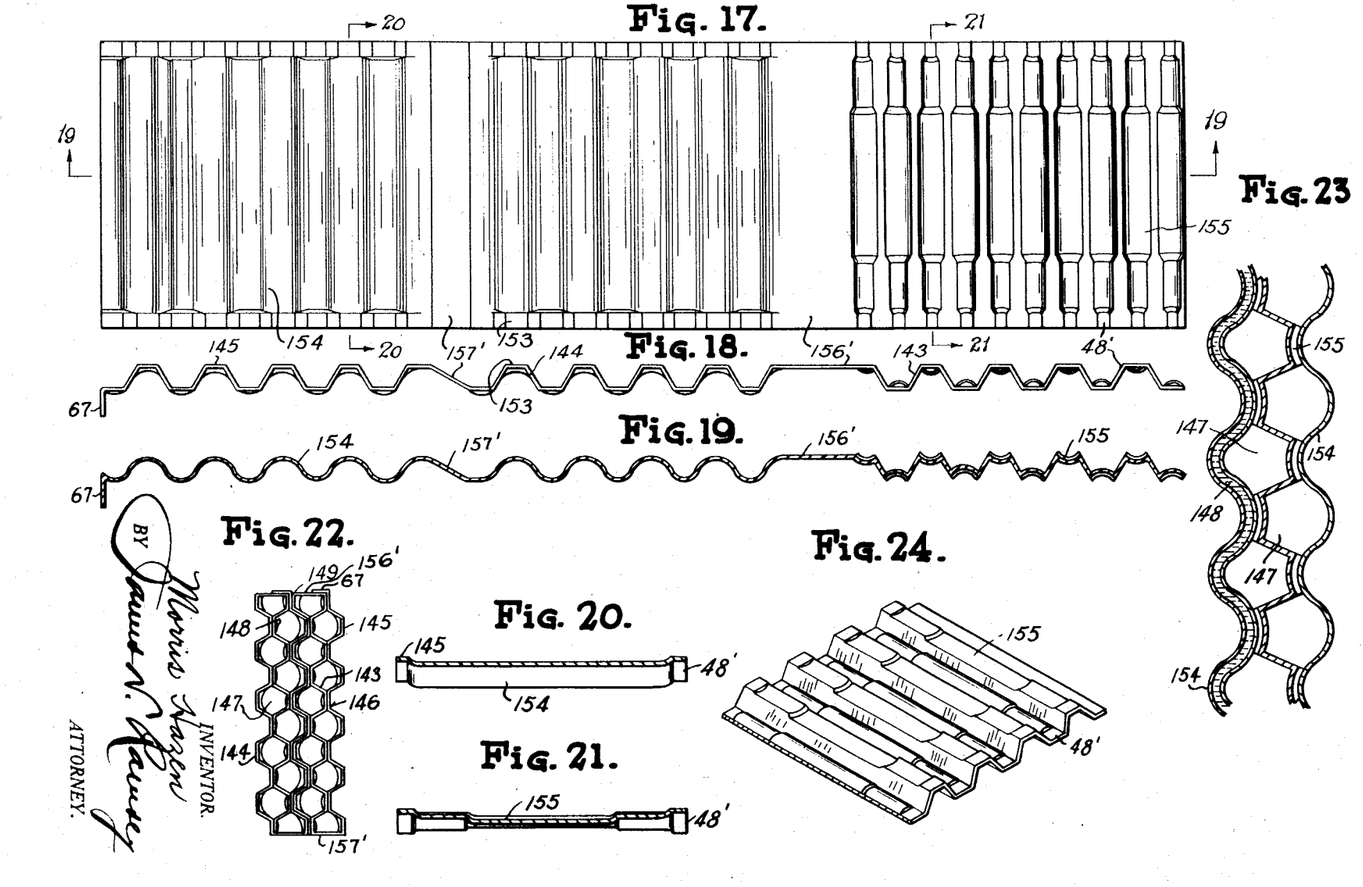
Fig. 17 is a plan view of the formed metal strip before being bent upon itself.
Fig. 18 is an edge view thereof.
Fig. 19 is a longitudinal vertical section taken on the line 19—19 of Fig. 17.
Fig. 20 is a cross section taken on the line 20—20 of Fig. 17.
Fig. 21 is a cross section taken on the line 21—21 of Fig. 17.
Fig. 22 is an end elevational view showing two strips bent upon itself, forming two radiator sections or units in assembled position.
Fig. 23 is a fragmentary section of Fig. 22 on an enlarged scale showing clearly the water passages and air passages.
Fig. 24 is a perspective view of a portion of the formed strip constituting the central portion or third of the completed unit.
Figure 25:
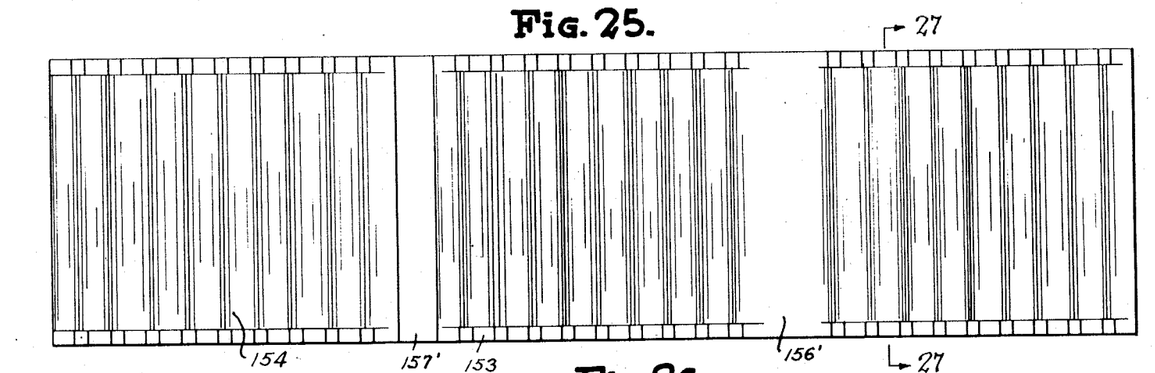
Fig. 25 shows a modified form of the strip shown in Fig. 17 whereby the vertical air passages 155 are eliminated.
Figures 26, 27, 28:
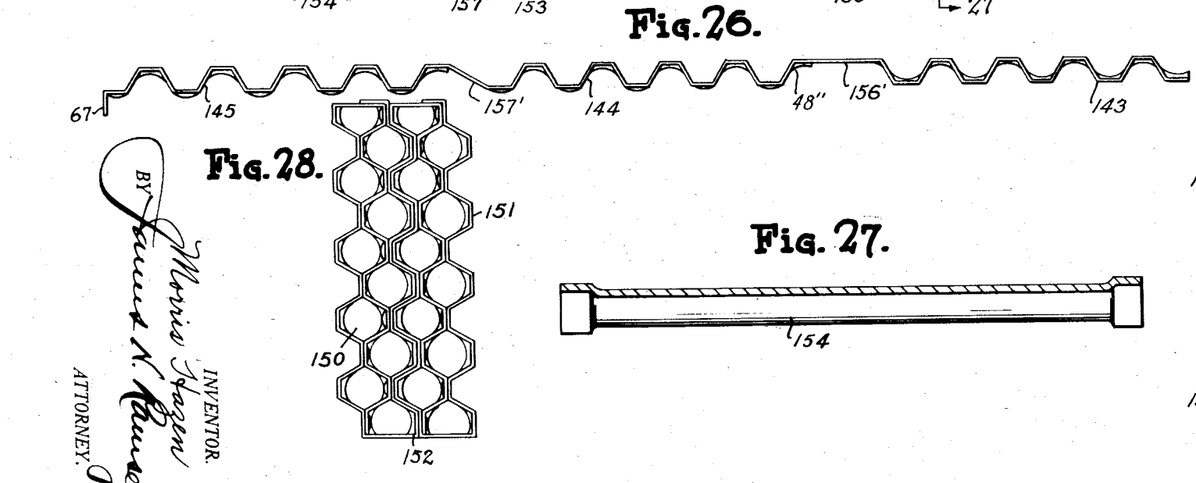
Fig. 26 is an edge elevational view thereof.
Fig. 27 is an enlarged transverse cross-section taken on a plane corresponding to line 27—27 of Fig. 25.
Fig. 28 is an end elevational view showing two strips bent upon themselves forming two radiator sections or units in assembled position with the vertical air passages 155 omitted.
Figure 29:
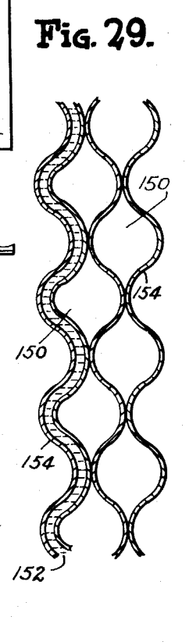
Fig. 29 is an enlarged fragmentary section similar to that shown in Fig. 23 but showing a modified construction whereby the air passages 155 are eliminated.

The intermeshing rollers 44 and 45 and mechanism 66 are adapted to form the strip 48′ shown in Figs. 17 and 18. Each of the rollers actually comprises the die faces having forming parts 140, 141, and 142 for forming the strip, as clearly shown in Figs.

17 and 18, in portions 143, 144 and 145 so that portion 143 is bent upon portion 144, as shown in Fig. 19, and portion 145 is bent upon portion 143, whereby radiator section 146 is formed. The radiator is assembled as by placing several sections with portion 144 in contact with side 145 of the adjacent section, as shown in Fig. 21, after which the ends of the assembled sections are dipped in solder to seal the joints. The formations of the strips, when the sections are assembled in a radiator, provide air holes 147 through the sections and, also, vertically at 148, whereby the water or other cooling agency is adapted to flow between the assembled sections through space 149. The part 141 of forming roller 46 is of such shape as to form part 144, shown in Figs. 17, 18 and 19. The part 140 of said roller produces the part 143 of Figs. 17, 18 and 19, and the part 142 of the said forming roller produces part 145 of Figs. 17, 18 and 19.

In Figs. 22 and 23, is shown a modification of strip 48' which provides air holes 150 through the radiator sections 151, but the air may not travel vertically. The water space 152 permits the flow of water between the sections.

It is apparent that I have invented a highly practical machine for forming metal strips from which a radiator section may be constructed from a continuous metal strip which is corrugated centrally and provided with offset edges 153 to space the central corrugated portions 154 sufficiently to form a water channel space between each pair of sections. Moreover, by the additional offset portions 155 in approximately one third of each strip 48', a vertical air space is formed, which effectively improves the quick radiation of heat from the radiator.

It is further apparent that the strips may contain sufficient length and number of corrugations to provide a completed radiator of the required height and number of tubular openings to conform to the desired use. Also, the width of the strips may be as desired.

While I have chosen to illustrate the forms and constructions of the invention by the herein drawings and explanations of the same, it is understood that the invention resides in the combination, arrangement of the parts and in the details of the construction, as hereinafter claimed. It is further understood that changes in the precise embodiment of the invention, as disclosed herein, can be made within the scope of what is claimed without departing from the spirit of the invention, as other expedients may readily suggest themselves to the art. For instance, as shown in Fig. 9 rollers 44 and 45 are formed in three distinct forming surfaces 140, 141, and 142 of which surfaces 141 and 142 form corrugated portions 143 and 144 of strip 48'. Between surfaces 140 and 141 is surface 156, for the purpose, shown in Fig. 19, of forming the end 156' of section 146. Between surfaces 141 and 142 of the rollers is surface 157 to form end 157' of the strip. Between surface 140 and 142 of the rollers is surface 158 to form portion 158' of the strip adapted to be severed and then formed into bent end 67 by mechanism 66. This is the preferred form of the rollers 44 and 45, but I do not limit myself to the particular form of the strip shown and described, as changes in the form of the rollers may be desirable to provide a changed construction of the strip.

What I claim as new and desire to secure by Letters Patent is:

1. A machine for forming a metal strip and comprising a bed, a pair of intermeshing corrugated rollers each having three integral cooperating die faces adapted to form a strip to produce three-part integral corrugated sections, and means adapted to guide said strip between said intermeshing corrugated rollers, power transmitting mechanism operatively connected with said rollers and containing intermittent stop mechanism adapted to permit said rollers to stop rotation at predetermined periods, and cutting mechanism mounted on said bed and operatively connected with said intermittent stop mechanism and adapted to be automatically operated to sever said strips when said rollers are stationary.

2. A metal strip forming machine comprising a bed, supports therefor, means including a pair of intermeshing corrugated rollers adapted to withdraw a metal strip from a source of supply and corrugate it, a combination cutting and bending die mounted on said bed, and mechanism operatively connected with rollers and said combination cutting and bending die, whereby after said rollers have formed a predetermined length of said strip the power is automatically disconnected from said rollers and simultaneously connected with said cutting and bending die to sever said strip and bend its end.

3. In a metal strip forming machine having a bed and supports therefor, means including a pair of intermeshing forming rollers each having three integral forming die faces and adapted to withdraw said metal strip from a source of supply and form it, a cutting and bending die comprising male and female members mounted on said bed, stop mechanism operatively connected with said rollers and said cutting and bending die whereby after said rollers have formed a predetermined length of said strip, the power is automatically disconnected from said rollers and simultaneously connected to said cutting and bending die to sever and bend said strip, after which the power is automatically disconnected from said cutting die and simultaneously connected with said rollers, substantially as and for the purposes specified.

4. A metal strip forming machine comprising a bed, forming mechanism mounted on said bed and comprising cooperating die faces having a plurality of forming portions offset intermediate their ends, whereby a metal strip is adapted to be mounted on said bed and fed between said cooperating die faces and whereby the strip is formed, and cutting and bending mechanism comprising a pair of male and female members adapted to receive said strip, after it is formed, and sever and bend its end.

5. A metal strip forming machine comprising a bed, a pair of forming rollers having co-operating die faces for forming a strip in integral portions, said strip being centrally corrugated, its ends offset and a portion of said corrugations being offset for the purpose set forth, cutting and forming mechanism comprising a pair of dies adapted to receive, sever and bend the end of the formed portion of said strip whereby when said strip is twice bent upon itself a section of a radiator core is formed, and mechanism operatively connected with said rollers and said forming and cutting mechanism adapted to automatically connect power with said rollers and disconnect power from said dies, for the purposes specified.

6. A machine comprising a bed, a pair of forming rollers having cooperating die faces in three integral portions one of which portions differs in shape from the other two and rotatably mounted on said bed whereby a metal strip is adapted to be fed between the cooperating die faces and whereby said strip is formed into three portions integrally connected with each other, cutting mechanism mounted on said bed, and intermittent stop mechanism operatively connected with said rollers and said cutting mechanism and adapted to disconnect power from said rollers and simultaneously connect power with said cutting mechanism after a predetermined length of said strip is formed, substantially as set forth and for the purposes specified.

7. A metal strip forming machine comprising a bed, a pair of rollers having cooperating die faces and rotatably mounted on said bed whereby a metal strip is adapted to be fed between said cooperating die faces and whereby said strip is pressed into the form shown and for the purposes specified, cutting and bending mechanism comprising a pair of cutting dies comprising male and female members adapted to receive, sever and bend said strip after it is formed, and mechanism operatively connected with said rollers and said forming and cutting mechanism and adapted to automatically and intermittently disconnect power from said rollers and simultaneously connect power with said cutting dies whereby said strips are severed successively.

8. The herein described method of making radiator core sections from a continuous strip of flat metal which consists in passing said strip of flat metal through forming dies whereby it is corrugated and formed into three integral sections two of which are alike and one of which is different from the other two, said two sections which are alike being centrally corrugated with their ends offset for the purpose of forming water grooves therein and the other section which is different being centrally corrugated and its ends offset whereby when said different section is bent between said two sections which are alike vertical air spaces are formed therein between said sections and vertical water grooves on the outer walls of said section.

MORRIS HAZEN.